United States Patent [19]
Cabasso et al.

[11] Patent Number: 5,783,325
[45] Date of Patent: Jul. 21, 1998

[54] GAS DIFFUSION ELECTRODES BASED ON POLY(VINYLIDENE FLUORIDE) CARBON BLENDS

[75] Inventors: Israel Cabasso; Youxin Yuan, both of Syracuse. N.Y.; Xiao Xu, Fremont, Calif.

[73] Assignee: The Research Foundation of State of New York, Albany, N.Y.

[21] Appl. No.: 697,582

[22] Filed: Aug. 27, 1996

[51] Int. Cl.$^6$ .................................... H01M 4/88
[52] U.S. Cl. .................... 429/42; 427/115; 502/101
[58] Field of Search .................... 502/101; 427/115; 429/42

[56] References Cited

U.S. PATENT DOCUMENTS

| | | |
|---|---|---|
| 3,671,317 | 6/1972 | Rifkin . |
| 3,899,354 | 8/1975 | Kordesch . |
| 3,912,538 | 10/1975 | Dews et al. . |
| 4,401,519 | 8/1983 | Kadija et al. .................... 502/101 X |
| 4,440,617 | 4/1984 | Solomon .................... 204/290 R |
| 4,444,852 | 4/1984 | Liu et al. .................... 429/42 X |
| 4,461,814 | 7/1984 | Klinedinst .................... 429/42 |
| 4,826,742 | 5/1989 | Reiser .................... 429/33 |
| 4,847,173 | 7/1989 | Mistunaga et al. .................... 429/41 |
| 5,547,911 | 8/1996 | Grot .................... 429/42 X |

FOREIGN PATENT DOCUMENTS 667298 2/1952 United Kingdom .

OTHER PUBLICATIONS

*Proceedings, Int. Power Source Symposium,* 1990. "A Polymer Chemist's View on Fuel Cell Electrods" by J. Manassen and I. Cabasso (month unknown).
*J. Applied Electrochemistry,* 22 (1992). "Thin-film catalyst layers for polymer electrolyte fuel cell electrodes" by M.S. Wilson and S. Gottesfeld (month unknown).
*Encylopedia Polymer Science and Engineering,* 2nd Ed., John Wiley & sons, Inc., vol. 9 (1987). "Membranes" by I. Cabasso (month N/A).

*Primary Examiner*—Stephen Kalafut
*Attorney, Agent, or Firm*—Morgan & Finnegan, L.L.P.

[57] ABSTRACT

All electrocatalytic gas diffusion electrode for fuel cells and a process for its preparation is disclosed. The electrode comprises an anistropic gas diffusion layer and a catalytic layer. The gas diffusion layer is made of a porous carbon matrix through which carbon particles and poly(vinylidene) fluoride are distributed so that the matrix is homogeneously porous in a direction lateral to gas flow and asymmetrically porous to gases in the direction of the gas flow. The porosity of the gas diffusion layer decreases in the direction of gas flow. The catalytic layer is made of a coagulated ink suspension containing catalytic carbon particles and a thermoplastic polymer selected from polyethersulfone, poly(vinylidene fluoride) and sulfonated polysulfone and covers the small pore surface of the gas diffusion layer. The gas diffusion layer has a thickness between 50 μm and 300 μm. The catalytic layer has thickness between 7 μm and 50 μm and a metal catalyst loading between 0.2 mg/cm$^2$ and 0.5 mg/cm$^2$.

23 Claims, 5 Drawing Sheets

GAS DIFFUSION ELECTRODES BASED ON POLY(VINYLIDENE FLUORIDE) CARBON BLENDS

FIELD OF INVENTION

This invention relates to the preparation of gas diffusion electrodes for use in solid polymer electrolyte fuel cells, the gas diffusion electrodes comprised of poly(vinylidenefluoride) ("$PVF_2$") blended with carbon and a platinum metal electrocatalyst.

BACKGROUND OF THE INVENTION

Fuel cells are electrochemical devices in which part of the energy of a chemical reaction is converted directly into direct current electrical energy. The direct conversion of energy into direct current electrical energy eliminates the necessity of converting energy into heat thereby avoiding the Carnot-cycle efficiency limitation of conventional methods of generating electricity. Thus, without the limitation of the Carnot-cycle, fuel cell technology offers the potential for fuel efficiencies two to three times higher than those of traditional power generator devices, e.g., internal combustion engines. Other advantages of fuel cells are quietness, cleanliness (lack of air pollution) and the reduction or the complete elimination of moving parts.

Typically, fuel cells contain two porous electrical terminals called electrodes with an electrolyte disposed therebetween. In the operation of a typical fuel cell, a reductant permeates an anodic electrode to a catalyst layer where it reacts to form two protons and two electrons. The protons are transported through an electrolayer to the cathode. The electrons are conducted from the anode to the cathode through outside resistance producing electrical power. An oxidant permeates the anode electrode to combine with the electrons at a cathode catalyst layer. Fuel cell reactants are classified as oxidants and reductants on the basis of their electron acceptor or electron donor characteristics. Oxidants include pure oxygen, oxygen-containing gases (e.g., air) and halogens (e.g., chlorine). Reductants include hydrogen, carbon monoxide, natural gas, methane, ethane, formaldehyde and methanol.

The electrolyte of the fuel cell serves as the electrochemical connection between the electrodes providing a path for ionic current in the circuit while the electrodes, made of carbon or metal, provide an electrical pathway. Further, the electrolyte prevents transfer of the reactants away from the respective electrodes where the formation of explosive mixtures can occur. The electrolyte utilized must not react directly to any appreciable extent with the reactants or reaction products formed during the operation of the fuel cell. Further, the electrolyte must permit the migration of ions formed during operation of the fuel cell. Examples of electrolytes that have been used are aqueous solutions of strong bases, such as alkali metal hydroxides, aqueous solutions of acids, such as sulfuric acid and hydrochloric acid, aqueous salt electrolytes, such as sea water, fused salt electrolytes and ion-exchange polymer membranes.

One type of fuel cell is a polymer electrolyte (PEM) fuel cell which is based on a proton exchange polymer membrane. The PEM fuel cell contains a solid polymer membrane which is an "ion-exchange membrane" that acts as an electrolyte. The ion-exchange membrane is sandwiched between two "gas diffusion" electrodes, an anode and a cathode, each commonly containing a metal catalyst supported by an electrically conductive material. The gas diffusion electrodes are exposed to the respective reactant gases, the reductant gas and the oxidant gas. An electrochemical reaction occurs at each of the two junctions (three phase boundaries) where one of the electrodes, electrolyte polymer membrane and reactant gas interface.

For example, when oxygen is the oxidant gas and hydrogen is the reductant gas, the anode is supplied with hydrogen and the cathode with oxygen. The overall chemical reaction in this process is: $2H_2+O_2 \rightarrow 2H_2O$. The electrochemical reactions that occur at the metal catalyst sites of the electrodes are as follows:

anode reaction: $2H_2 \rightarrow 4H^+ + 4e^-$
cathode reaction: $O_2 + 4H^+ + 4e^- \rightarrow 2H_2O$ During fuel cell operation, hydrogen permeates through the anode and interacts with the metal catalyst, producing electrons and protons. The electrons are conducted via an electronic route through the electrically conductive material and the external circuit to the cathode, while the protons are simultaneously transferred via an ionic route through the polymer electrolyte membrane to the cathode. Concurrently, oxygen permeates to the catalyst sites of the cathode, where the oxygen gains electrons and reacts with the protons to yield water. Consequently, the products of the PEM fuel cell reactions are water and electricity. In the PEM fuel cell, current is conducted simultaneously through ionic and electronic routes. Efficiency of the PEM fuel cell is largely dependent on the ability to minimize both ionic and electronic resistivity to current.

Gas diffusion electrodes play an important role in fuel cells. During fuel cell operation, fuel gases interact with fuel cell electrodes and heterogeneous reactions occur at catalyst sites of the electrodes. To process these reactions, the electrode catalyst simultaneously must interface with the conductive carbon, electrolyte and fuel gas. Therefore, the electrode must satisfy the following criteria: 1) low diffusion resistance of the gas to reaction sites; 2) high electronic conductivity; 3) mechanical strength for long-term operation; 4) proper hydrophilicity/hydrophobicity balance; and 5) stability.

Gas diffusion electrodes for fuel cells conventionally are made of platinum metal supported on a carbon black and polymer substrate. The polymer serves as a binder for the carbon black particles to ensure physical integrity, i.e., the mechanical strength of the electrode. Carbon is used to minimize electronic resistance of the electrode while platinum serves as the catalyst for the electrochemical reaction.

A majority of gas diffusion electrodes for fuel cells use polytetrafluoroethylene ("PTFE") as the binder. This polymer has high thermal stability and high resistance to chemical degradation. However, PTFE does not dissolve in any known solvent and hence, must be used as a suspension. This complicates the process of fabricating an electrode. More specifically, when PTFE is used as the polymer binder for carbon, it is difficult to control electrode structure, electrode porosity and pore size.

Teflon® type gas diffusion electrodes for fuel cells are commonly prepared by mixing PTFE with carbon or graphite powder and pressing it into a sheet in which the PTFE serves as a binder. This sheet is heat treated to a sintering temperature, for example, 300° C. to 350° C., in which the binder partially degrades creating a porous matrix in which gas can pass and interact with the carbon. U.S. Pat. No. 4,847,173 describes a method of preparing a carbon and polymer matrix by either mixing the PTFE in combination with other polymers or with binding agents of other polymers. U.S. Pat. No. 3,899,354 describes another method of making a matrix of carbon and PTFE or other polymer binder by spraying carbon paper with a suspension of a mixture of PTFE and carbon until a thick layer is obtained forming an electrode matrix, and then heating the matrix to a sintering temperature, as described above.

Cabasso and Manassen in *Proceedings, Int. Power Source Symposium*, 1990, describe another method for preparing fuel cell electrodes. Instead of pressing or spraying the polymer binder and carbon to form a matrix and then sintering the matrix to form a gas diffusion layer, carbon containing platinum catalyst is mixed with a $PVF_2$ solution, cast and then immersed in dimethyl formamide, a non-solvent that precipitates the $PVF_2$. Cabasso et al. also state that many other soluble polymers exist that are resistant under the fuel cell conditions employed, i.e., low operating currents up to 200 $mA/cm^2$, relatively low operating temperature (25° C. to 40° C.) and a pressure only slightly above atmospheric pressure. In fact, most of the polymer degrades because of the high acidic nature of the membranes, high temperature operation up to 95° C. and because of the electrical currents of up to several $A/cm^2$ that passes through the matrix.

Cabasso et al. reported two methods of preparing an electrode matrix containing a platinum catalyst therein. In one method, the electrode matrix is prepared by homogeneously casting a solution containing a mixture of platinum catalyst, carbon, $PVF_2$ and a solvent onto a glass plate. By doing so, the platinum catalyst is uniformly spread through the electrode matrix. In the other method, a solution of a mixture of carbon, platinum catalyst, polymer and solvent is cast onto a glass plate, a graphite cloth is then put carefully on top of the film mixture and, on top of that, a mixture of carbon polymer without the platinum catalyst is cast. This was immersed in water and had the structure of three layers of carbon catalyst polymer glued to the carbon on one side and on the other side, a carbon polymer layer.

Most research in the past several decades has used PTFE as the binder for carbon substrates in gas diffusion electrodes (Teflon® type electrode) and focused on the maximum amount of catalyst used in the electrodes. The function of platinum-on-carbon/electrocatalyst-PTFE blended with carbon mixture as a component of the gas diffusion electrode in the $H_2/O_2$ fuel cell is well known. Platinum-on-carbon PTFE mixtures commonly have been prepared by mixing platinum black, or platinum-on-carbon (finely mixed) with an aqueous colloidal, negatively charged, hydrophobic dispersion of PTFE particles and depositing this mixture onto a carbon cloth substrate (Report No. AFML-TR-77-68). Wet-proofed, thin, porous carbon paper also has been used as a substrate instead of carbon cloth to make gas diffusion electrodes, as disclosed in U.S. Pat. No. 3,912,538. This electrode has overcome the "flooding" problem during fuel cell operation.

Several techniques have been developed to increase platinum catalyst utilization. Methods resulting in tenfold catalyst reduction by using improved electrode structure were developed by Los Alamos National Laboratory (Gottesfield et al., J. Applied Electrochemistry, 22 (1992), p. 1) Los Alamos, N.Mex. and Texas A&M University, College Station, Tex. based on electrodes from Prototech (U.S. Pat. No. 4,826,742). In their methods, the electrodes produced by Prototech with a 0.4 $mg/cm^2$ Pt loading then were sputter deposited with Pt to produce a thin layer of Pt (0.05 $mg/cm^2$) on the front surface of the electrodes. Fuel cells assembled with these electrodes and a Nafion 112 membrane exhibited 1 $A/cm^2$ at 0.5 V using $H_2$—$O_2$ as the reactant gases and had no significant loss of performance, even after 50 days of operation. Gottesfield et al. describe a method by which the Pt loading was reduced to 0.15 $mg/cm^2$. This method involved painting a PTFE membrane sheet with ink made of organic solvents, Pt-C and Nafion solution.

For good performance, a fuel cell electrode must have proper morphology and catalyst distribution. The fuel cell electrode requires a porous structure that provides a free transport pathway for the gas permeate and distributes the gas permeate over the entire surface area of the electrode catalyst. How efficiently the fuel gas is distributed to the electrode catalyst highly depends upon the porosity in the electrode, an essential parameter in determining electrode efficiency.

It is, therefore, an object of this invention to produce a low cost, easy to prepare gas diffusion electrode with favorable chemical and electrical properties for fuel cells and other electrochemical applications.

Another object of the invention is to provide a gas diffusion electrode with a controlled electrode structure, porosity and pore size.

An object of this invention is to provide a process for preparing gas diffusion electrodes with a controlled porosity and pore size by using a blend of activated carbon and poly(vinylidene fluoride) dissolved in an organic solvent, which is then coagulated in a non-solvent for the blend at low temperatures as a porous membrane in a phase inversion mode.

A further object of this invention is to provide a process for making gas diffusion electrodes in which a gas diffusion layer and a catalyst layer are fabricated separately, making it possible to formulate each structure with properties that are most suitable for its function.

Yet another object of this invention is to provide a simple process for making a gas diffusion electrode using a one-step phase inversion technique.

SUMMARY OF THE INVENTION

The objectives and criteria for the gas diffusion electrode mentioned above and its preparation can be achieved by the practice of this invention. In one aspect, this invention concerns an electrocatalytic gas diffusion electrode for fuel cells comprised of:

an anisotropic gas diffusion layer that is made of a porous carbon matrix through which carbon particles and poly (vinylidene fluoride are distributed such that the matrix is homogeneously porous in a direction lateral to gas flow and asymmetrically porous to gases in the direction of gas flow, the porosity of the gas diffusion layer decreasing in the direction of gas flow, the gas diffusion layer having a thickness between about 50 µm and about 300 µm, and a catalytic layer that is made of a coagulated "ink" suspension containing catalytic carbon particles and a thermoplastic polymer, the catalytic layer covering the small pore surface of the gas diffusion layer, the catalytic layer having a thickness between about 7 µm and about 50 µm and a metal catalyst loading between about 0.2 $mg/cm^2$ and about 0.5 $mg/cm^2$.

In another aspect, this invention concerns a process for preparing a gas diffusion electrode suitable for use in fuel cells, the process comprising:

a. preparing an anisotropic gas diffusion layer that is made of a porous carbon matrix through which carbon particles and poly(vinylidene fluoride) are distributed such that the matrix is homogeneously porous in a direction lateral to gas flow and asymmetrically porous to gases in the direction of gas flow, the porosity of said gas diffusion layer decreasing in the direction of gas flow, the gas diffusion layer having a thickness between about 50 µm and about 300 µm, the gas diffusion layer prepared by 1) casting with a Doctor knife onto a carbon substrate a blend of poly(vinylidene fluoride) and carbon black dissolved in a solvent for the poly (vinylidene fluoride) and carbon black to form a layer of film on the carbon substrate, the blend penetrating into at least part of the carbon substrate; 2) coagulating the film in a coagulation liquid that is a non-solvent for the poly (vinylidene fluoride) and carbon black; and 3) removing the coagulation solvent; and b. painting onto the small pore surface of the gas diffusion layer a catalytic layer that is made of a coagulated aqueous ink suspension containing catalytic carbon particles and a thermoplastic polymer, the thermoplastic polymer being selected from the group consisting of polyethersulfone, poly (vinylidene fluoride) and sulfonated polysulfone, the catalytic layer covering the small pore surface of said gas diffusion layer, said catalytic layer having a thickness between about 7 μm and about 50 μm and a metal catalyst loading between about 0.2 mg/cm$^2$ and about 0.5 mg/cm$^2$.

DETAILED DESCRIPTION OF THE INVENTION

Figure 1A:
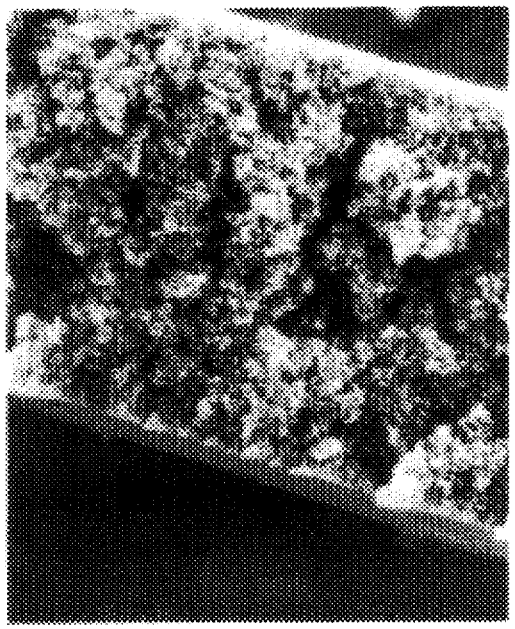
FIGS. 1a and 1b are scanning electron microscope photographs magnified 100× of a PVF$_2$-carbon gas diffusion electrode showing (a) a cross-section; and (b) a surface.

Polymeric material serves a number of functions simultaneously in the gas diffusion electrode of the fuel cell. It acts as a binder to hold the carbon catalyst together to provide the integrity of the electrode, and imparts hydrophobicity. The platinum metal (Pt) catalyst in an electrode functions best if it simultaneously interfaces with the carbon, the electrolyte, and the reactant gases. For high Pt utilization, low ohmic loss and be flood-free, the electrode matrix must be constructed to accommodate these conditions. The structure should be prepared so that the ionic and electronic pathways are short, with minimum tortuosity, while the catalyst should have maximum exposure and utilization of reactant gas without drowning and weeping. Since platinum is an expensive catalyst, it should be used in a minimum amount with maximum efficiency. Therefore, localization of Pt near the surface of the electrode, adjacent to the reactant gas, was found to be most advantageous for electrode performance. Bacon's dual layer model structure of the electrode (See British Patent No. 667,298) has been widely accepted. It has an asymmetric anisotropic structure with one layer of side open pores facing the gas side and the other relatively small, fine pores facing the electrolyte side. The former can facilitate gas transport, the latter will be filled with electrolyte, thus, preventing further gas diffusion that causes gas crossover problems.

Applicants have discovered that an inexpensive thermoplastic polymer, poly(vinylidene fluoride), can be used to form a blend of a poly(vinylidene fluoride) and carbon particles that is suitable as an electron matrix material. Poly(vinylidene fluoride) is a hydrophobic, semicrystalline polymer with a high melting temperature (Tm of about 168° C.) and a low glass transition temperature (Tg of about 35° C.). It is resistant to oxidative and reducing environments. Further, it has good durability and a working capability at low pH. Poly(vinylidene fluoride) has proven to be an excellent building block for a variety of porous membranes for gas separation (I. Cabasso in "Encyclopedia Polymer Science and Engineering", 2nd Ed., John Wiley & Sons, Inc., 9, 509 (1987)) and ultrafiltration.

According to the present invention, when poly(vinylidene fluoride) is blended with carbon particles in a polymer-to-carbon ratio by weight between about 20:80 and about 45:65, poly(vinylidene fluoride) functions as an excellent binder, by itself, for the carbon particles in the blend. As a result, poly(vinylidene fluoride) successfully can be used to replace the more expensive PTFE polymers as a binder and a matrix-builder for gas diffusion electrodes. The poly (vinylidene fluoride) polymer in the blend provides the electrode structure with properties that are essential for producing high quality fuel cell electrodes.

Gas diffusion electrodes according to applicants' invention are prepared by a two-step method.

The first step uses a phase inversion method to prepare an anisotropic gas diffusion layer according to applicants' invention having a thickness above about 50 μm, preferably above about 75 μm, and below about 300 μm, preferably below about 150 μm. The phase inversion method includes the following sequence: 1) casting with a Doctor knife onto a conductive carbon substrate a blend of poly(vinylidene fluoride) and carbon particles dissolved in a solvent for the poly(vinylidene fluoride) forming a layer of film on the carbon substrate; 2) coagulating the film in a coagulation liquid that is a non-solvent for the poly(vinylidene fluoride); and 3) drying the film to remove the coagulation liquid.

The second step is to prepare a catalyst layer that uses an air brush to paint a layer of catalyst-carbon-polymer "ink" onto a carbon-polymer gas diffusion layer, the catalytic "ink" layer having a thickness above about 7 μm and below about 50 μm, preferably below about 10 μm. The ratio of metal catalyst on carbon to the polymer in the "ink" is between 25:75 and 40:60 by weight. The electrode in this invention has a higher porosity in the gas diffusion layer, lower catalyst loading, and higher catalyst utilization. The fuel cell assembled with this electrode has high performance.

The conductive carbon substrate is a fibrous or porous sheet having a thickness above about 7 μm, preferably above about 10 μm, and below about 35 μm, preferably below about 25 μm thick. Suitable conductive carbon substrates include carbon paper, high conducting carbon cloth, high conducting carbon felt, carbon tape and the like.

The particulate carbon is, for example, a carbon black having a surface area, by the B.E.T. method, of about 50 to about 2000 m$^2$/g. Suitable particulate carbons include active carbon or carbon black, i.e., carbon powder which is in a very finely divided state. When measured by the B.E.T. method, commercially available carbon black powders useful in this invention have a surface area between about 50 $m^2/g$ and about 2000 $m^2/g$. Such powders include furnace blacks, lamp blacks, acetylene blacks, channel blacks, and thermal blacks. Furnace blacks having a B.E.T. surface area between about 200 $m^2/g$ and about 600 $m^2/g$ are preferred. The particle sizes of these active carbon materials can range from about 5 to as much as about 1000 nanometers, but are preferably smaller than about 300 nanometers in average size.

The B.E.T. method refers to the Brunaver-Emmett-Teller method of determining surface area.

The term "carbon black" is used as defined in U.S. Pat. No. 4,440,167 to Solomon.

Commercially available carbon blacks having a B.E.T. surface area between about 50 and about 300 $m^2/g$ can be steam activated, if desired, to enhance their surface area and thereby increase their B.E.T. value up to about 600 $m^2/g$.

The surface characteristics of carbon blacks can vary. Some of these carbon blacks have surface functionality, e.g., surface carboxyl groups (and other types of oxygen content) or fluorine-containing groups. Physico-chemical characteristics and ash content also can vary. Moreover, carbon blacks can be graphitized (whereby the carbon black powders acquire some of the structural characteristic of graphite) or graphitized and then treated to restore or enhance surface functionality.

Preferred commercially available carbon blacks include BLACK PEARLS (trade designation), e.g., BLACK PEARL 2000, VULCAN (trade designation e.g., Vulcan VX-72), KETJEN BLACK EC 300J (trade designation of Akzo Chemie Americo of Burt, N.Y.), activated charcoal, Acetylene Black C-100, or mixtures thereof. The available KETJEN BLACK materials are oil furnace blacks having a B.E.T. surface area ranging from about 900 to about 1000 $m^2/g$, and EC 300J in particular appears to have a surface area of 950 $m^2/g$. KETJEN BLACK EC 300J contains a large fraction of mesophase carbon and hence has regions of long range order. These regions may make the carbon more corrosion resistant which is important in cathode applications.

According to U.S. Pat. No. 4,461,814 to Klinedienst, KETJEN BLACK oil furnace blacks have both high surface area (greater than 900 $m^2/g$) and high dibutyl phthalate ("DBP") absorption numbers. Klinedienst discloses that when the DBP absorption is determined by ASTM test D-2414-70, the absorption number should preferably be above 125 $cm^2$ per 100 g of carbon black (e.g., greater than 230 $cm^3/100$ g) and the surface area should be greater than 250 $m^2/g$, to provide a carbon black cathode collector with optimum characteristics. The DBP absorption number for KETJEN BLACK is reported by Klinedienst to be 340 $cm^3/100$ g. Acetylene blacks tend to have high DBP absorption numbers but low B.E.T. surface area. Conversely, Lurgi carbon blacks (from Lurgi Umivett and Chemotechnik GmbH) can have very high B.E.T. surface area (greater than 1200 $m^2/g$) and a low DBP absorption number (less than 100). "CSX" carbon blacks (available from Cabot Corporation of Billerica, Mass.) also are reported to have high B.E.T. surface areas and high DBP absorption numbers.

Suitable solvents for the polyvinylidene fluoride and carbon blend include those selected from the group consisting of cyclohexane, δ-butyrolactone, ethylene carbonate, N,N-dimethyl formamide ("DMF"), dimethyl sulfoxide ("DMSO"), N-methyl pyrrolidone, N,N-dimethyl acetamide ("DMA"), and a mixture of DMF with tetrahydrofuran ("THF"). The amount of solvent required to dissolve the polyvinylidene fluoride will vary depending on the solvent. For example, 10–20% by weight of polyvinylidene fluoride will dissolve in DMF.

Suitable coagulation liquids that are non-solvents for the blend of polyvinylidene fluoride and carbon particles are those selected from the group consisting of water, aliphatic and cycloaliphatic hydrocarbons, alcohols such as ethanol and isopropanol, ketones such as acetone and methylisobutylketone, hexane and mixtures of water and other coagulation liquids that are miscible with water.

Porous carbon materials such as Vulcan XC-72, Acetylene Black C-100 and Black Pearl 2000 may be used to prepare gas diffusion electrodes according to applicants' method without resulting in water flooding problems that commonly occur when such carbons are used in fuel cell electrodes. Such carbon materials absorb such immense quantities of liquids that flooding of the gas electrodes would be expected to result if the carbon was cast in a blend. If carbons with low surface area like Vulcan XC-72, etc. are used, they do not absorb much liquid and too much liquid is needed to produce a composition that can be cast as a film. Consequently even a film of a few hundred micrometers thickness so made does not contain enough active carbon material for the electrode. Moreover, carbon materials, such as charcoal, have high electrical resistance and because of their size, they form a highly porous matrix that cannot tolerate the elevated pressures that standard fuel cell assemblies are exposed to, i.e., pressures between 20 psi and 100 psi. Therefore, charcoal has not been used in the production of fuel cell electrodes.

Applicants unexpectedly discovered that the flooding problem could be overcome and that such carbon materials could be cast in a solvent by using sonication at high frequencies. Thus, to overcome the problem of immense absorption of liquids by carbon materials like Vulcan XC-72, which are used routinely in the production of fuel cell electrodes, an organic solvent (DMF) and poly (vinylidene fluoride), together with the carbon material are treated to yield a suspension that is well mixed by a sonicator. Sonication at high frequencies results in a slurry that can be cast at the desired thickness on a carbon cloth substrate. Applicants believe that the sonication does not let the carbon absorb sufficient liquid to hinder the formation of an electrode by a casting step. Applicants have found that when a mixture of the poly(vinylidene fluoride), a platinum metal catalyst and carbon material are sonicated, a slurry is obtained that can be cast at much thinner thicknesses with much less solvent interfering in the casting process. Therefore, applicants' invention permits the casting of carbons that are popular for fuel cell electrodes.

Figure 1B:
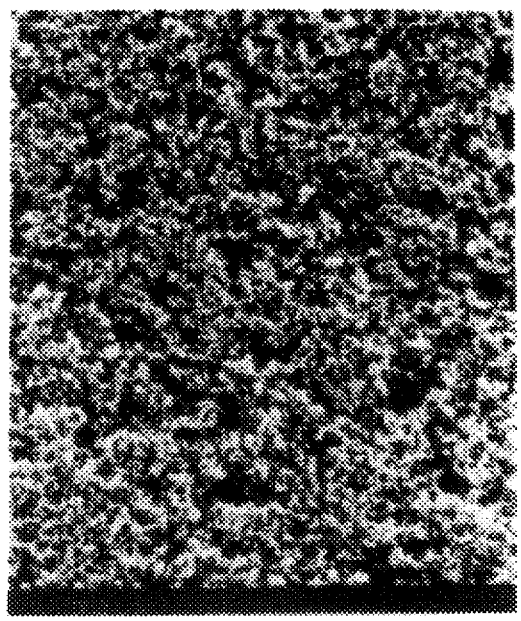

The formation of good gas diffusion electrodes requires spreading the reactant gases homogeneously within the matrix of the gas diffusion electrode. Gases are fluids and behave like fluids that stream along the least resistant pathway. In the fuel cell, the reactant gases stream toward the catalyst layer where they are consumed. One problem in fuel cell devices, and especially electrodes, is homogeneity of the pathways. If the electrode matrix is denser in one area and less dense in another area, then most of the gas stream will be directed to the less denser area. As a result, the catalyst will not be fully utilized. Applicants' gas diffusion electrode had an electrode matrix that is homogeneous laterally, and asymmetric in the direction of the gas flow. This means that when entering the electrode, the gases penetrate the gas diffusion electrode through the surface which is "open," less resistant, and as the gases "diffuse," toward the surface the electrode matrix is progressively denser and its pores are smaller. Therefore, the electrode matrix of the present invention has an anisotropic porous structure with two asymmetric surface layers, as seen in FIG. 1 herein.

Applicants also have found that when the mixture of poly(vinylidene fluoride), carbon material and a platinum metal catalyst is not sonicated and is cast as a solution on a glass substrate, as described in the Cabasso et al. 1990 paper, double density surfaces form because of the way that glass interacts with the polymer carbon mixture. Surprisingly, applicants found that the sonicated slurry must be cast on a conductive carbon cloth or conductive carbon paper to ensure the anisotropic structure of the electrode that facilitates entry of the permeating gases. The sonicated slurry, when cast on a carbon cloth that subsequently is submerged in water ensures the anisotropic structure.

Gas diffusion and distribution in the matrix is important for performance of the electrodes. Calculation of the gas layer on the carbon cloths has been extensively studied. Applicants also have discovered that when the cast slurry is coagulated in a coagulation liquid that is a non-solvent for the slurry at lower temperatures, a much higher quality of gas diffusion electrode and anisotropically porous structure that is homogeneous laterally results.

Suitable coagulation bath temperatures may range from ambient to −30° C. When the coagulation liquid comprise the mixture of water and an alcohol or water and an inorganic salt, temperatures below 0° C. and above −20° C. preferably are employed. When the coagulation liquid is water, temperatures from 25° C. to 4° C. preferably are employed.

Suitable coagulation liquids that are non-solvents for the polyvinylidene fluoride are aqueous solutions made of a water or a mixture of water and alcohol and/or water with inorganic salt in ratios by volume between 20:80 and 80:20. Preferably water is used as the coagulation liquid. When the coagulation liquid is a mixture, preferred is a mixture of water and alcohol or water and salt in ratios by volume between 10:90 and 90:10. Suitable alcohols include ethanol and isopropanol. Suitable salts include $CaCl_2$, LiCl, NaCl and $LiNO_3$. Other suitable coagulation liquids that are non-solvents for the polyvinylidene fluoride are aliphatic and cycloaliphatic hydrocarbons, alcohols, acetone and methylisobutyl ketone.

The following examples illustrate applicants' invention, but should not be construed as limiting the invention:

EXAMPLE 1

Gas diffusion electrodes were prepared using a high surface (DP-5,200) area (200 m²) carbon black (commercially available as Vulcan VX-72R from Cabot, Inc.) and a poly(vinylidene fluoride) having a number average molecular weight of 60,000 by the wet phase inversion technique. The carbon black was dispersed in a 20 wt % solution of poly(vinylidene fluoride) and N,N,-dimethylformamide to form a suspension. The suspension was mixed well for 30 minutes using a sonicator forming a slurry. Using a Doctor blade knife, the resulting slurry was cast onto a 0.015" thick, hydrophobic, carbon cloth substrate (commercially available as Panex PWB-3 from Zoltek) until a layer of film having a thickness of 100 μm was formed on the substrate. Care was taken during casting to make sure the slurry at least partially penetrated the cloth.

The film then was submerged in a deionized water bath to coagulate the film. The coagulated film was washed extensively with deionized water and placed in a dry box to dry for at least 24 h. The dried film formed the anisotropic gas diffusion layer of a gas diffusion electrode and had pore sizes progressively increasing from top to bottom with the smaller pores on the surface (see FIG. 1). Then, this gas diffusion layer of the electrode was heated at 250° C. for 1 h.

Figure 2A:
FIGS. 2a and 2b are scanning electron microscope (SEM) photographs magnified 200× of a cross-section of a PVF$_2$-carbon gas diffusion electrode according to the present invention showing (a) a secondary image; (b) x-ray pt-mapping.
Figure 2B:
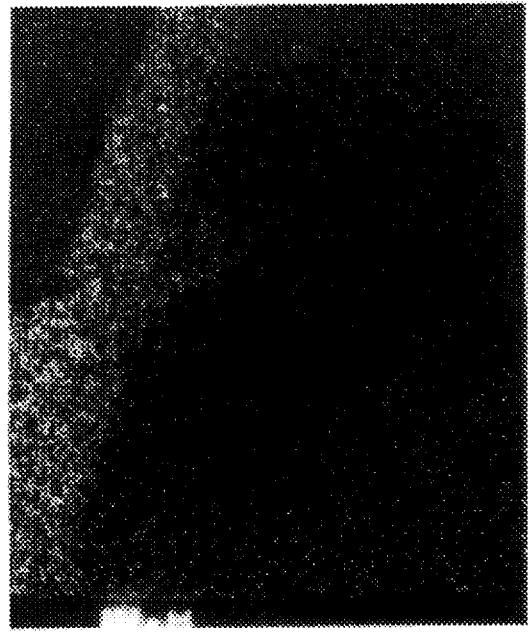

A catalyst layer "ink" suspension was prepared as follows: 0.06 g polyvinylidene fluoride ($PVF_2$) was suspended into 4 g 2-propanol and 6 g water by a sonicator. Then, 0.05 g of a non-ionic surfactant (Triton-X-100) and 0.3 g of 20 wt % of Pt on Vulcan VX-72 carbon black was added to the $PFV_2$ colloidal solution. The mixture was mixed again by the ultrasonicator to form a final suspended "ink" solution. Then, an art air-brush was used to evenly paint this "ink" onto the surface of the gas diffusion electrode. The painting procedure consisted of applying 6.98 g "ink" suspension to 126 cm² of the gas diffusion layer. The resulting electrode has a platinum loading of 0.30 mg/cm² with a 20 μm thick catalytic layer. The size of the platinum particles was in the range of 40 Å. The electrode then was heated to 250° C. for at least 2 h. The cross-section of this electrode is shown in FIG. 2.

Figure 3:
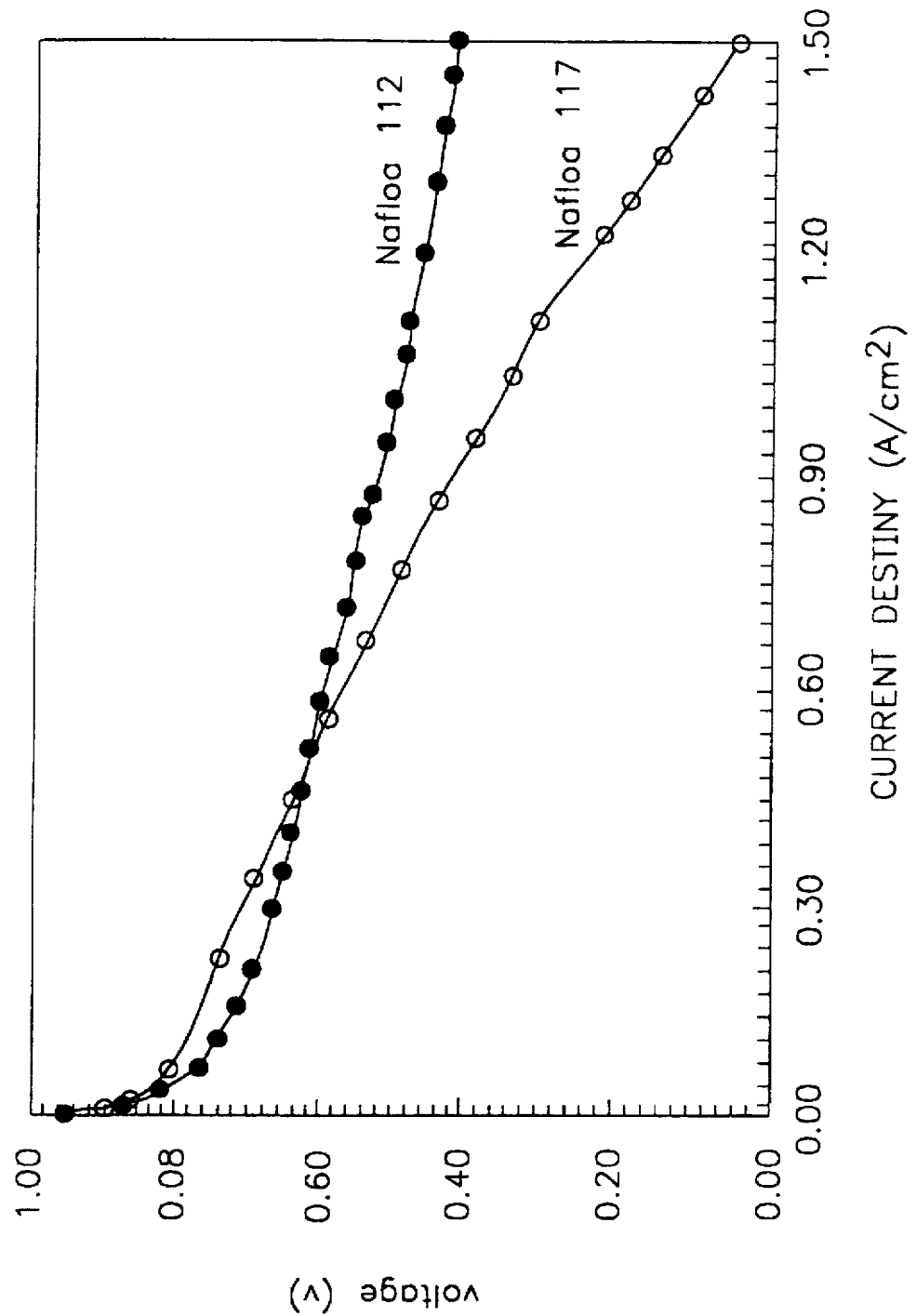
FIG. 3 is a graph of cell potential (cell voltage (V)) vs. current density (A/cm$^2$) for a fuel cell assembly according to the invention containing a gas diffusion electrode made as described in Example 1 with Nafion 112(●) and 117(0) membranes at 80° C., 30 psig, and 80° C., 60 psig respectively.
Figure 4:
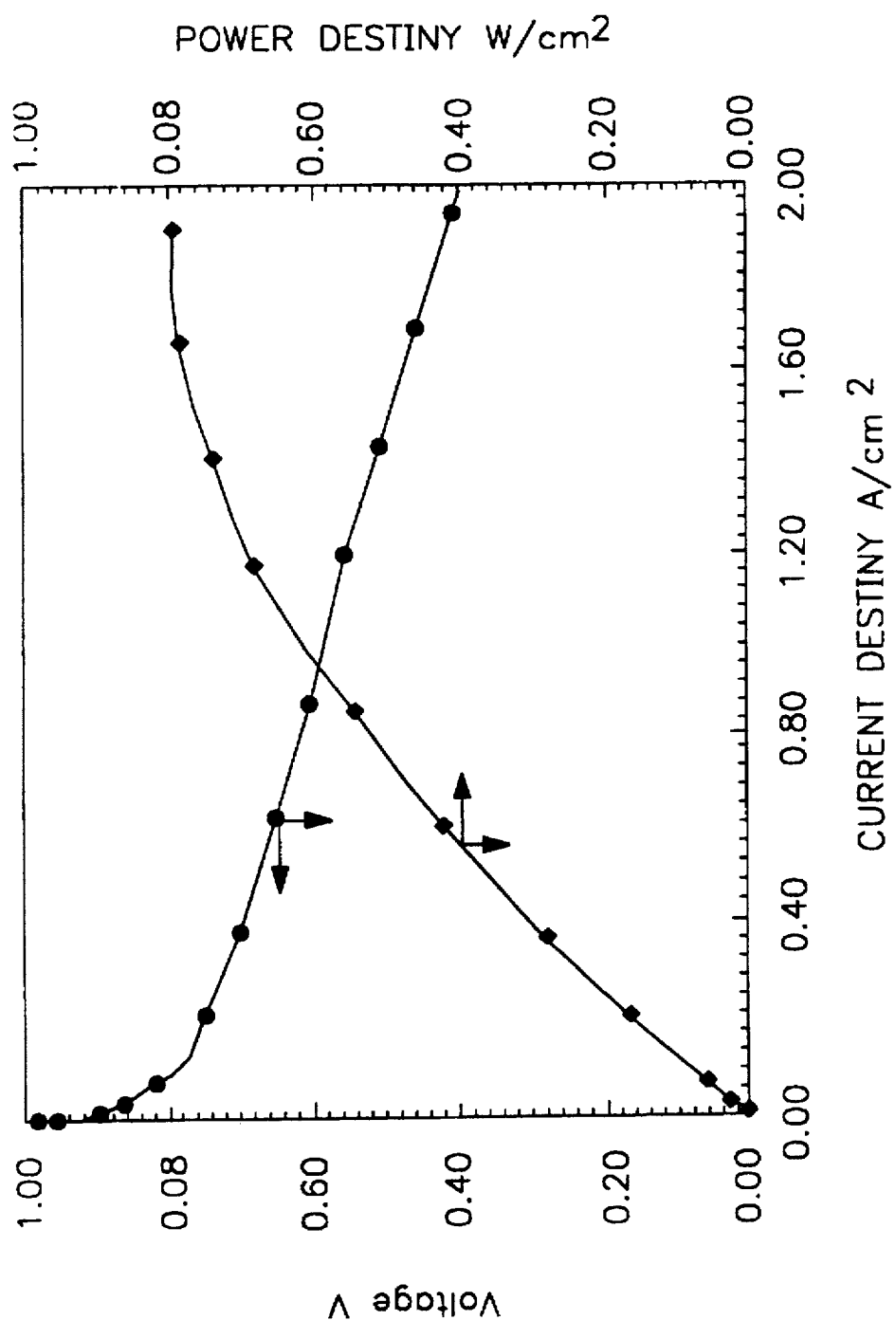
FIG. 4 is a polarization curve and power density for a fuel cell assembly according to the invention containing a gas diffusion electrode made as described in Example 1 with Nafion 112 membrane tested at 80° C. and 30 psig.
Figure 5:
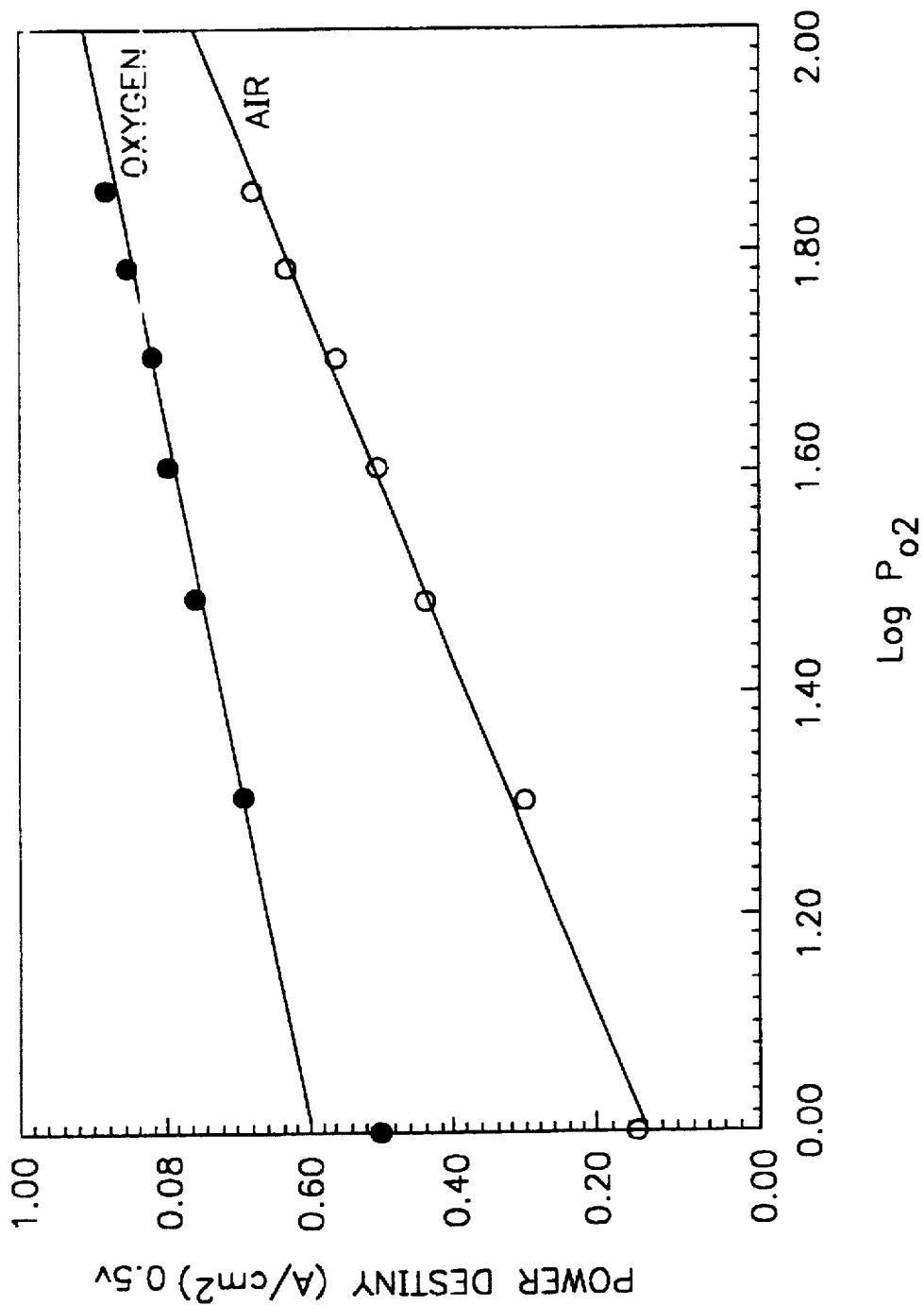
FIG. 5 is a graph of current density (A/cm$^2$) vs log pressure of cathode reactant gas for a fuel cell assembly according to the invention containing a gas diffusion electrode made as described in Example 1 electrode with Nafion 117 membrane at 80° C.

The gas diffusion electrode made in this way was evaluated in a $H_2/O_2$ fuel cell. The catalyst side of the electrode was brushed with 0.5 wt % of protonated 117 Nafion solution, and hot pressed to a Nafion 112 (or Nafion 117) membrane. An open cell voltage of 1.02 V was measured. FIG. 3 shows polarization curves of a fuel cell using a gas diffusion electrode made according to Example 1 and Nafion 112 and 117 membranes. FIG. 4 shows polarization curves of the fuel cell electrode using an Example 1 electrode with Nafion 112 membrane at 80° C., 30 psig of $H_2/O_2$ reactant. At 0.5 V, a power density of 0.6 W/cm² at a 1 A/cm² current density was able to be drawn, demonstrating the good performance of this electrode. The utilization of this electrode was 26% and Ohmic resistance $R_i$ was 0.185 Ω/cm², and the Tafel slope was 0.059 V/decade. This fuel cell was also tested with $H_2$/air as the reactant. FIG. 5 shows a plot of the cell current density at a constant voltage of 0.5 V vs oxygen or air/gas pressure. It was clearly observed that, by using air as the cathodic reactant, this electrode has better performance than any other electrode.

EXAMPLE 2

The process of Example 1 was repeated, except that the gas diffusion layer was made by dry phase inversion. Poly (vinylidene fluoride) and Acetylene Black C-100 carbon were dissolved in DMF to form a paste. The paste was cast onto a carbon cloth substrate and then dried in air allowing the solvent to completely evaporate and forming a cast layer of film. The film then was pressed through two rollers at room temperature to produce the gas diffusion layer of the electrode. A fuel cell made with this electrode and a Nafion 112 membrane had an open cell voltage of 1.0 V and at 0.7 V under 25° C., 1 atm., the current density was 200 mA/cm².

EXAMPLE 3

0.5 g platinum on Activated Charcoal (10 wt % Pt, Fluka Chemical, Inc.) was suspended in 1.6 g DMF and mixed with 1.6 g 15 wt % $PVF_2$ in DMF solution by a sonicator. This suspension was then cast onto a carbon cloth substrate using a Doctor knife to form a layer of film. The film was submerged in a deionized water bath for 30 seconds to coagulate it. The coagulated film then was removed from the water bath, washed extensively and placed in a dry box to dry for 24 h. The platinum loading of the catalytic layer was 0.5 mg/cm². The thickness of the gas diffusion electrode formed was approximately 150 µm. A fuel cell made using this gas diffusion electrode and a Nafion 117 membrane had a current density of 500 mA/cm² at 0.45 V, under 25° C., 1 atm test conditions.

EXAMPLE 4

The process of Example 1 was repeated, except for the addition of a highly hydrophobic, carbon black (5–20% range), Acetylene Black C-100 (Chevron Chemical Co.) having a surface area of 60 m²/g. The surface concentration of platinum in the catalyst layer in this example was 0.1 mg/cm². The fuel cell prepared by this electrode, which introduced second carbon particles into the gas diffusion layer, had a 100 mV improvement at a current density of 200 mA/cm² over a fuel cell without second carbon particles.

EXAMPLE 5

0.6 g Vulcan carbon black with 0.4 g PVF$_2$ was mixed in 6.7 g DMF by a sonicator to form a paste. The resulting paste then was cast onto a carbon cloth with a Doctor knife. The plate was then submerged in a non-solvent bath, herein called D.I. water, or tetrahydrofuran ("THF"), or ethanol. The coagulated film was then air dried. The second layer, which contained 0.5 g Pt on Vulcan VX-72 carbon black (10 wt % Pt), was suspended in 1.6 g DMF and mixed with 1.6 g solution of polysulfone in DMF (15 wt %), then cast onto the first gas diffusion layer by a Doctor knife. The resulting air dried electrode allows the solvent to be completely evaporated from the cast film. The electrode was then heated at 250° C. for 4 h under nitrogen atmosphere. The final electrode has a Pt loading of ~0.5 mg/cm².

EXAMPLE 6

The process of Example 3 was repeated, except that poly(vinylpyrrolidone) PVP was used as a pore filter to control the porosity of the gas diffusion layer and obtain the necessary open pore structure. PVP was mixed with the polymer solution before casting the gas diffusion layer. The PVP was subsequently removed by rinsing the electrode with water for three days. Overall cell voltage of a fuel cell made with this gas diffusion electrode and a Nafion 117 membrane increased to approximately 200 mV.

EXAMPLE 7

Two gas diffusion electrodes were made according to the process of Example 1 except that two different coagulation baths were used in making the gas diffusion layer. One of the coagulation baths consisted of 50 parts water by volume and 50 parts ethanol by volume. The second coagulation bath consisted of an aqueous solution saturated with CaCl. Two samples of Carbon black dispersed in poly(vinylidene fluoride) and dimethylformamide in a 10 weight percent solution were sonicated and the sonicated slurries were cast on a carbon substrate and subsequently coagulated, respectively, with the first and second coagulation baths at −10° C. Coagulation of both slurries was extremely slow while a controlled gas diffusion layer formed essentially free of defects. Fuel cells made using these gas diffusion electrodes yielded 15% better power densities than a fuel cell constructed with the gas diffusion electrode in Example 1.

What is claimed is:

1. An electrocatalytic gas diffusion electrode for fuel cells comprised of:

an anisotropic gas diffusion layer that is made of a porous carbon matrix through which carbon particles and poly(vinylidene fluoride) are distributed such that the matrix is homogeneously porous in a direction lateral to gas flow and asymmetrically porous to gases in the direction of gas flow, said layer having first and second surfaces that are oppositely disposed to one another, gas permeating through said first surface and exiting said second surface during use of said electrode, the porosity of said gas diffusion layer decreasing from said first to said second surface in the direction of gas flow, said gas diffusion layer having a thickness between about 50 µm and about 300 µm, and a catalytic layer that is made of a coagulated ink suspension containing metal catalyst loaded carbon particles and a thermoplastic polymer, the catalytic layer covering the second surface of said gas diffusion layer, said catalytic layer having a thickness between about 7 µm and about 50 µm and a metal catalyst loading between about 0.1 mg/cm² and about 0.5 mg/cm².

2. The electrode of claim 1, wherein said catalytic layer contains from about 5 to about 25% weight percent of said poly(vinylidene fluoride) polymer, the balance being said metal catalytic loaded carbon particles.

3. The electrode of claim 1, wherein said gas diffusion layer has a polymer-to-carbon ratio by weight between about 20:80 and about 45:55.

4. The electrode of claim 1, wherein in said gas diffusion layer, the carbon particles are selected from the group consisting of an activated carbon, a carbon black, an acetylene black, and mixtures thereof, the carbon particles having a B.E.T. surface area between about 50 m²/g and 2000 m²/g.

5. The electrode of claim 1, wherein said gas diffusion layer further includes poly(vinylpyrrolidone).

6. The electrode of claim 1, wherein the polymer in the catalytic layer is selected from the group consisting of poly(vinylidene) fluoride, sulfonated polysulfone, sulfonated polyethersulfone, and sulfonated poly(phenylene oxide).

7. The electrode of claim 1, wherein the metal catalyst loaded carbon particles comprise nobel metal catalyst particles adhered to carbon carrier particles having a B.E.T. surface area between about 200 m²/g and 2000 m²/g.

8. The electrode of claim 7, wherein the nobel metal loaded carbon particles comprise noble metal catalyst particles deposited on said carbon carrier particles, said noble metals being selected from the group consisting of platinum, palladium, rhodium and iridium, and being present in an amount between 10–20% by weight of said carbon carrier particles.

9. The electrode of claim 1, wherein said gas diffusion layer has a thickness between about 75 µm and about 150 µm.

10. The electrode of claim 1, wherein said catalytic layer has a thickness between 7 µm and 10 µm, said metal catalyst is platinum and the loading of platinum catalyst is between 0.15 mg/cm² and 0.5 mg/cm².

11. The electrode of claim 1, wherein the catalytic layer comprises platinum alloys mixed with, by weight, 5–30% poly(vinylidene) fluoride and 70–95% carbon particles.

12. A process for preparing a gas diffusion electrode suitable for use in fuel cells, the process comprising:

a. preparing an anisotropic gas diffusion layer that is made of a porous carbon matrix through which carbon particles and poly (vinylidene fluoride) are distributed such that the matrix is homogeneously porous in a direction lateral to gas flow and asymmetrically porous to gases in the direction of gas flow, said layer having first and second surfaces that are oppositely disposed to one another, gas permeating through said first surface and exiting said second surface during use of said electrode, the porosity of said gas diffusion layer decreasing from said first to said second surface in the direction of gas flow, said gas diffusion layer having a thickness between about 50 µm and about 300 µm, said gas diffusion layer prepared by 1) casting with a Doctor knife onto a carbon substrate a blend of poly(vinylidene fluoride) and carbon particles dissolved in a solvent for the poly(vinylidene fluoride) to form a layer of film on the carbon substrate, the blend penetrating into at least part of the carbon substrate; 2) coagulating the film in a coagulation liquid that is a non-solvent for the poly (vinylidene fluoride); and 3) removing the coagulation solvent; and b. painting onto the second surface of said gas diffusion layer a catalytic layer that is made of a coagulated ink suspension containing metal catalyst loaded carbon particles and a thermoplastic polymer, said catalytic layer comprises 0.5–2% thermoplastic polymer, said thermoplastic polymer being selected from the group consisting of polyethersulfone, poly (vinylidene fluoride) and sulfonated polysulfone, said catalytic layer covering the second surface of said gas diffusion layer, said catalytic layer having a thickness between about 7 µm and about 50 µm and a metal catalyst loading between about 0.1 mg/cm$^2$ and about 0.5 mg/cm$^2$.

13. The process of claim 12, wherein in step (a)(1), said gas diffusion layer is made with a solution that comprises 5–25 wt % of poly(vinylidene) fluoride in N, N'-dimethyl formamide.

14. The process of claim 12, wherein in step (a)(1), said carbon particles are selected from the group consisting of an activated carbon, a carbon black, an acetylene black, and mixtures thereof, the carbon particles having a B.E.T. surface area between about 50 m$^2$/g and 2000 m$^2$/g.

15. The process of claim 14, wherein in step (a)(1), the blend of PVF$_2$ and carbon particles dissolved in a solvent for the PVF$_2$ is sonicated for a time period sufficient to homogeneously mix the PVF$_2$ with the carbon particles.

16. The process of claim 14, wherein in step (a)(1), the solvent for the PVF$_2$ is selected from the group consisting of cyclohexane, δ-butyrolactone, ethylene carbonate, N,N-dimethyl formamide, dimethyl sulfoxide, N-methyl pyrrolidone, N,N-dimethyl acetamide, and a mixture of N,N-dimethyl formamide with tetrahydrofuran.

17. The process of claim 12, wherein in step (a)(2), said gas diffusion layer is made using a coagulation liquid selected from the group consisting of water, ethanol, water/ N, N'-dimethyl formamide, water/ethanol, water/methanol, water/isopropanol, tetrahydrofuran and mixtures thereof.

18. The process of claim 17, wherein in step (a)(2), said coagulation liquid has a temperature between ambient temperature and –30° C.

19. The process of claim 12, wherein in step (b), said catalytic layer includes a non-ionic surfactant.

20. The process of claim 12, further including the step (c) of sintering the electrode between 200° C. and 300° C. for a time period between 0.25 hr and 2 hours.

21. The process of claim 12, wherein in step (a)(1), said gas diffusion layer is made with a solution comprised of 10–20 wt % of PVF$_2$ in N,N-dimethyl formamide.

22. The process of claim 12, wherein in step (b), the ratio of Pt-on-carbon to thermoplastic polymer is between 25:75 and 40:60.

23. The process of claim 12, wherein in step (a)(2), the coagulation solvent is selected from the group consisting of water, ethanol, water and N,N-dimethyl formamide mixture, and tetrahydrofuran.

* * * * *

UNITED STATES PATENT AND TRADEMARK OFFICE
CERTIFICATE OF CORRECTION

PATENT NO. : 5,783,325

DATED : July 21, 1998

INVENTOR(S) : Israel Cabasso; Youxin Yuan and Xiao Xu

It is certified that errors appear in the above-identified patent and that said Letters Patent is hereby corrected as shown below:

On the title page, Item [73] Assignee information which now reads "The Research Foundation of State of New York" should read --The Research Foundation of State University of New York--.

Signed and Sealed this

Thirteenth Day of July, 1999

*Attest:*

Q. TODD DICKINSON

*Attesting Officer*     *Acting Commissioner of Patents and Trademarks*